US010173732B2

(12) United States Patent
Trannoy et al.

(10) Patent No.: US 10,173,732 B2
(45) Date of Patent: Jan. 8, 2019

(54) CROSSPIECE FOR VEHICLE

(71) Applicant: Faurecia Interieur Industrie, Nanterre (FR)

(72) Inventors: Mickaël Trannoy, Cauvigny (FR); Laurent Baudart, Fresnoy en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 15/337,172

(22) Filed: Oct. 28, 2016

(65) Prior Publication Data

US 2017/0120956 A1 May 4, 2017

(30) Foreign Application Priority Data

Oct. 29, 2015 (FR) ...................................... 15 60395

(51) Int. Cl.
*B60J 7/00* (2006.01)
*B62D 25/14* (2006.01)
(Continued)

(52) U.S. Cl.
CPC ........... *B62D 25/145* (2013.01); *B62D 27/02* (2013.01); *B62D 29/001* (2013.01); *B62D 29/005* (2013.01)

(58) Field of Classification Search
CPC ...... H01L 2924/00; H01L 2224/45124; B60N 2/22; B60N 2/68; E06B 3/26347;
(Continued)

(56) References Cited

U.S. PATENT DOCUMENTS 7,731,261 B2 * 6/2010 Wenzel ................. B29C 45/006
                                                         180/90
7,810,873 B2 * 10/2010 Hitz ..................... B60H 1/0055
                                                         296/193.02
(Continued)

FOREIGN PATENT DOCUMENTS

DE     102011101581 A1    11/2012
DE     102013218353 A1     3/2014
(Continued)

OTHER PUBLICATIONS

French Preliminary Search Report and Opinion in French for application No. FR1560395, dated Jun. 1, 2016, 7 pages.

Primary Examiner — Kiran B Patel
(74) Attorney, Agent, or Firm — Reising Ethington P.C.

(57) ABSTRACT

A crosspiece for a vehicle dashboard extends in a longitudinal direction and has a first portion and a second portion. The first portion is made of a first material and has a closed cross-section perpendicular to the longitudinal direction and a hollow joining end. The second portion has a main part extending in the longitudinal direction, and a joining part fitted into the joining end of the first portion. The main part has an open cross-section perpendicular to the longitudinal direction that is adapted for demolding in a demolding direction perpendicular to the longitudinal direction during manufacture of the second portion of the crosspiece. The joining part has a closed hollow cross-section perpendicular to the longitudinal direction that is adapted for demolding in the longitudinal direction during manufacture of the second portion of the crosspiece.

10 Claims, 3 Drawing Sheets

(51) Int. Cl.
  *B62D 29/00* (2006.01)
  *B62D 27/02* (2006.01)
(58) Field of Classification Search
  CPC ... A61L 31/06; B05B 11/007; B05B 11/0072; B65D 47/263
  USPC .................................................... 296/193.02
  See application file for complete search history.

(56) References Cited

U.S. PATENT DOCUMENTS

| | | | |
|---|---|---|---|
| 7,841,648 B2 | 11/2010 | Perarnau Ramos et al. | |
| 8,020,355 B2* | 9/2011 | Monteiro | B62D 25/145 29/447 |
| 8,485,590 B2* | 7/2013 | Maurer | B62D 29/008 296/193.02 |
| D691,523 S * | 10/2013 | Waugh | D12/159 |
| 8,919,855 B2* | 12/2014 | Ruiz Rincon | B62D 25/145 296/193.02 |
| 8,950,778 B2* | 2/2015 | Fukushima | B62D 25/145 280/779 |
| 9,446,800 B2* | 9/2016 | Davos | B62D 29/001 |
| 2004/0135400 A1* | 7/2004 | Matsuzaki | B29C 45/14598 296/193.02 |
| 2004/0150251 A1* | 8/2004 | Matsutani | B62D 25/142 296/193.02 |
| 2005/0040558 A1* | 2/2005 | Baudart | B29C 43/102 264/259 |
| 2007/0221426 A1 | 9/2007 | Tsushima | |
| 2009/0152898 A1* | 6/2009 | Kawamura | F16L 13/147 296/193.02 |
| 2011/0227369 A1* | 9/2011 | Abe | B62D 21/15 296/193.02 |
| 2011/0233964 A1* | 9/2011 | Matsutani | B62D 25/145 296/193.02 |
| 2013/0057026 A1* | 3/2013 | Kim | B62D 25/145 296/192 |
| 2013/0241235 A1* | 9/2013 | Baudart | B62D 25/147 296/193.02 |
| 2014/0049075 A1* | 2/2014 | Kasper | B62D 25/145 296/205 |
| 2014/0103685 A1* | 4/2014 | Mani | B62D 25/145 296/193.02 |
| 2014/0125086 A1* | 5/2014 | Da Costa Pito | B62D 25/145 296/72 |
| 2014/0327270 A1* | 11/2014 | Baudart | B62D 25/145 296/193.02 |
| 2015/0145275 A1* | 5/2015 | Baudard | B62D 25/145 296/72 |
| 2017/0120956 A1* | 5/2017 | Trannoy | B62D 27/02 |

FOREIGN PATENT DOCUMENTS

| | | |
|---|---|---|
| EP | 1731410 A1 | 12/2006 |
| EP | 1731411 A1 | 12/2006 |
| JP | 2001253368 A | 9/2001 |

* cited by examiner

CROSSPIECE FOR VEHICLE

FIELD OF THE INVENTION

The present invention relates to crosspieces for vehicles, particularly crosspieces for motor vehicle dashboards. More particularly, the invention relates to crosspieces for motor vehicle dashboards comprising at least two portions made of two different materials, and to the assembly of such portions.

BACKGROUND

A crosspiece for a motor vehicle dashboard is already known that extends substantially in a longitudinal direction and comprises:
- a first portion of the crosspiece, made of a first material, the first portion of the crosspiece extending substantially in the longitudinal direction and having a closed cross-section perpendicular to the longitudinal direction, the first portion of the crosspiece comprising a hollow joining end,
- a second portion of the crosspiece, made of a second material, the first material being different from the second material.

The use of two different materials to create a vehicle crosspiece may in particular allow reducing the weight.

Document DE102011101581 discloses an example of a crosspiece comprising a first portion made of a first material and a second portion made of a second material, the first and second materials being different. The first and second portions are connected to one another by means of a connector fitted on the one hand into the first portion and on the other hand into the second portion. This connector is force-fitted into the first portion to secure it, or is secured by riveting. This connector is also fitted into the second portion, and a weld bead is provided to secure the second portion and the connector. The assembly of the first and second portions is thus achieved by means of a third part. This third part results in a more complicated manufacturing process. In addition, the attachment provided by this third part may not be sufficiently strong or robust, depending on the types of materials used for the first and second portions, which may pose safety issues. Therefore, for the purposes of creating a crosspiece that is not too heavy while retaining attractive mechanical properties of rigidity and robustness without complicating the industrial process, the present invention aims to improve the prior art.

SUMMARY

To this end, according to an aspect of the invention, there is provided a crosspiece of the aforementioned type wherein:
- the second portion of the crosspiece comprises a main part extending substantially in the longitudinal direction, and a joining part fitted into the joining end of the first portion of the crosspiece and securely attached to this joining end, the main part and the joining part forming a single piece;
- that the main part has an open cross-section perpendicular to the longitudinal direction, adapted for demolding in a demolding direction perpendicular to the longitudinal direction during manufacture of the second portion of the crosspiece; and in that the joining part has a closed hollow cross-section perpendicular to the longitudinal direction, adapted for demolding in the longitudinal direction during manufacture of the second portion of the crosspiece.

With these arrangements, it is possible to create a crosspiece in two parts with two different materials that can be assembled in a robust manner. For example, it is possible to create the second portion of the crosspiece with a composite material, and the open section of the second portion of the crosspiece simplifies the process of manufacturing the second portion of the crosspiece, particularly when it is made of a composite material, while enabling production with easy demolding. It is thus possible to reduce the weight of the crosspiece (because of the presence of a second portion of a second material) without changing the mechanical properties of such a crosspiece in comparison to a conventional single piece created of one material.

In various embodiments of the invention, one or more of the following arrangements may possibly be used:
- the first portion of the crosspiece is made of a metal material; for example, the first portion of the crosspiece is made of steel, aluminum, or a metal alloy;
- the second portion of the crosspiece is made of a composite material; for example, the second portion is made of a thermoplastic material;
- a flange is provided between the joining part and the main part;
- the flange comprises a first surface facing the joining part and the first portion of the crosspiece, and a second surface facing the main part;
- the first surface of the flange is adapted to form a stop in the longitudinal direction for the joining end of the first portion of the crosspiece; the flange then forms a stop during assembly but also in the event of impact in the longitudinal direction Y;
- the joining part comprises an outer surface facing the joining end of the first portion, the joining end of the first portion of the crosspiece comprises an inner surface facing the joining part, and the outer surface of the joining part is rough so as to grip the inner surface of the joining end;
- the first portion of the crosspiece has a first crosspiece end intended to be positioned near or next to a driver's seat of the vehicle;
- the second portion of the crosspiece has a second crosspiece end intended to be positioned near or next to a passenger seat of the vehicle;
- the first portion of the crosspiece extends in the longitudinal direction for a distance of between 300 and 500 millimeters;
- the second portion of the crosspiece extends in the longitudinal direction for a distance of between 500 and 900 millimeters;
- the joining part extends in the longitudinal direction for a distance of between 20 and 100 millimeters;
- the joining part has a conical shape, the smaller diameter base of the cone being oriented towards the main part;
- the joining end of the first portion of the crosspiece is crimped to the conical shape of the joining part;
- the joining part is cylindrical;
- gripping grooves are provided on the outer surface of the joining part;
- the flange extends in a flange plane that is normal to the longitudinal direction;
- a glue joint is arranged between the joining end and the joining part.

BRIEF DESCRIPTION OF THE DRAWINGS

Other features and advantages of the invention will be apparent from the following description of one of its embodiments, given by way of non-limiting example with reference to the accompanying drawings.

In the drawings.

In the various figures, the same references designate identical or similar elements.

DETAILED DESCRIPTION

Figure 1:
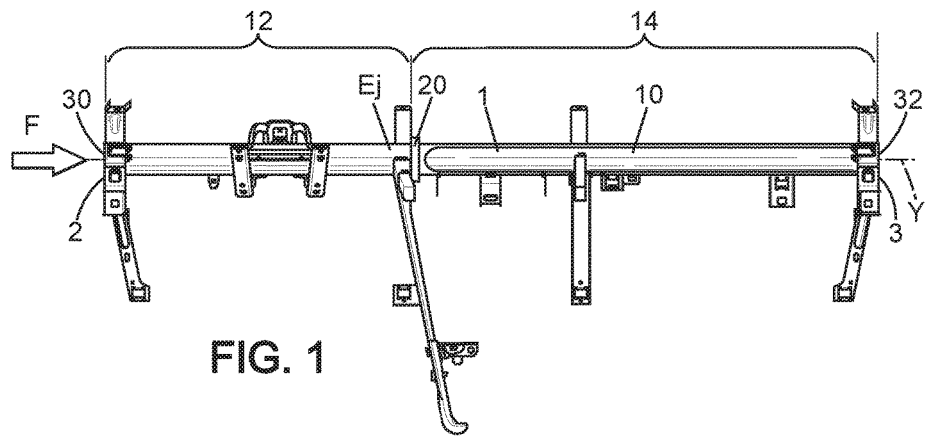
FIG. 1 is a front view of a vehicle crosspiece according to the invention in the assembled state.

The crosspiece 1 of a motor vehicle dashboard as represented in FIG. 1 is intended to be fixed transversely between the front pillars, or 'A' pillars, of a vehicle body structure (also called the frame). Its functions include stiffening the vehicle structure and supporting functional equipment of the vehicle such as the steering column, the heating, ventilation, and air conditioning system, or a car stereo. The crosspiece 1 comprises a crosspiece tube 10 extending in a longitudinal direction Y. The crosspiece tube 10 is connected to the body structure (or frame) of the vehicle by means of a driver's mounting bracket 2. More specifically, one end of the crosspiece tube is fixed to the driver's mounting bracket 2 which itself is intended to be fixed to the body structure of the vehicle on the driver's seat side of the vehicle. Similarly, the second end of the crosspiece tube 10 is connected to the body structure of the vehicle by means of a passenger mounting bracket 3. More specifically, the second end of the crosspiece tube is fixed to the passenger mounting bracket which itself is intended to be fixed to the body structure of the vehicle on the passenger seat side of the vehicle, the passenger seat being located next to the driver's seat in the transverse direction.

The crosspiece 1 has a first end 30 in the longitudinal direction Y intended to be oriented towards the driver's seat, and a second end 32 in the longitudinal direction Y intended to be oriented towards the passenger seat.

The crosspiece 1 comprises a first portion 12 made of a first material, and a second portion 14 made of a second material. The first and second materials are different.

For example, the first portion 12 of the crosspiece 1 is located near the driver's seat of the vehicle, and the second portion 14 of the crosspiece 1 is located near the passenger seat of the vehicle. In this case, the first portion 12 of the crosspiece 1 undergoes more stress than the second portion 14 of the crosspiece 1. The vehicle steering column, among other equipment, is fixed to the area of the crosspiece 1 located near the driver's seat and applies stress to this area in particular.

The material of the first portion 12 may be a metal. For example, the first portion 12 is made of steel, aluminum, magnesium, or other metal materials.

The first portion 12 of the crosspiece 1 extends substantially in the longitudinal direction Y. The first portion 12 of the crosspiece 1 has a closed cross-section perpendicular to the longitudinal section. For example, the first portion 12 of the crosspiece 1 has a circular (or O-shaped) cross-section. The cross-section of the first portion 12 may also be oval or rectangular or triangular. The material of the first portion 12 of the crosspiece 1 allows it to be easily demolded even with a closed cross-section. The first portion 12 of the crosspiece 1 is, for example, on the driver's side of the vehicle. The first portion 12 of the crosspiece 1 may comprise a portion of the crosspiece tube 10 and the driver's side bracket. In an alternative embodiment, the first portion 12 of the crosspiece 1 may comprise a portion of the crosspiece tube 10 only. In the embodiment illustrated in FIG. 2, the first portion 12 of the crosspiece 1 comprises the driver's side bracket and the portion of the crosspiece tube 10 near the driver's seat.

Figure 2:
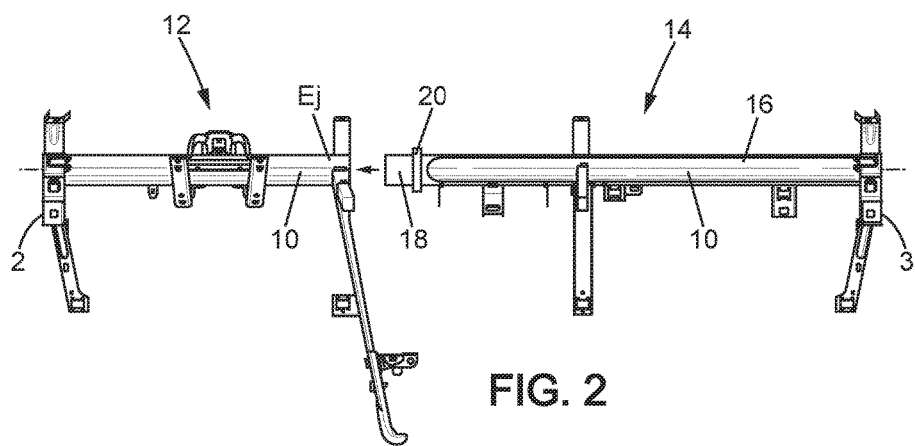
FIG. 2 is a front view of the crosspiece of FIG. 1 in the disassembled state.

As illustrated in FIG. 2, the first portion 12 of the crosspiece 1 comprises a joining end Ej located opposite the driver's side bracket 2. The joining end Ej of the first portion 12 is hollow and has dimensions such that it is suitable for partially fitting the second portion 14 of the crosspiece 1 into the joining end Ej of the first portion 12 of the crosspiece 1.

The second portion 14 of the crosspiece 1 is, as mentioned above, made of a second material that is different from the first material. The second material is a composite material. For example, the second material is for example a thermoplastic, thermosetting, or reinforced loaded material. For example, the second material may comprise both glass fibers and carbon fibers. The second material has a lower density than that of the first material and thus allows creating a dashboard crosspiece 1 that is lighter than a crosspiece made only of the first material.

The second portion 14 of the crosspiece 1 comprises at least one region which extends substantially in the longitudinal direction Y.

For example, as shown in FIG. 2, the second portion 14 of the crosspiece 1 comprises the passenger side mounting bracket 3 and a portion of the crosspiece tube 10. In other embodiments of the invention, the second portion 14 of the crosspiece 1 may comprise a region of the crosspiece tube 10 only, or a region of the crosspiece tube 10 and the driver's side mounting bracket. The second portion 14 of the crosspiece 1 comprises a main part 16 and a joining part 18. The joining part 18 faces the joining end Ej of the first portion 12 of the crosspiece 1 and is fitted therein. The main part 16 has an open cross-section perpendicular to the longitudinal direction. The cross-section of the main part 16 is open, such that it can easily be demolded. More particularly, the main part 16 of the second portion 14 of the crosspiece 1 has an open cross-section adapted for demolding in a demolding direction perpendicular to the longitudinal direction Y during manufacture of the second portion 14 of the crosspiece 1.

For example, in the example illustrated in FIG. 2, the main part 16 has a length of about 500 to 900 millimeters or between 600 and 800 millimeters in the longitudinal direction Y. The open section of the main part 16 allows creating the second portion 14 of the crosspiece 1 in a manner other than by demolding the main part 16 in the longitudinal direction Y, which would require a large ejection stroke. Indeed, with a closed cross-section, ejection must be in the longitudinal direction Y, and for some materials, such as composite materials, the demolding of such components is problematic. In other words, the main part 16 has an open cross-section whose side walls 34 each have an edge 36. The distance between the side walls is maximum at the side walls 34, and the joining plane Pj of the main part 16 is equidistant from the two edges, the distance between the side walls of the cross-section gradually decreasing until the two side walls meet at the joining plane Pj. The main part 16 is integral with the joining part 18.

The joining part 18 has a cross-section perpendicular to the longitudinal direction Y. The joining part 18 is hollow. The joining part 18 is adapted to be demolded in the longitudinal direction Y during manufacture of the second portion 14 of the crosspiece 1. For example, the joining part 18 extends in the longitudinal direction Y for a distance of about 70 to 100 mm. For this distance, demolding in the Y direction does not pose any problems. The closed cross-section of the joining part 18 ensures a more secure attachment of the joining part 18 and the joining end Ej.

In the current case, the second portion 14 of the crosspiece 1 comprises a discontinuity in the cross-section (or a change or discontinuity in the inertia) to allow this second portion 14 to be removed from the mold and to allow this second portion 14 to be fitted into and secured to the first portion 12 in a stable and sturdy manner. This discontinuity in the cross-section is particularly visible in FIG. 3 or FIG. 4. As shown, the second portion 14 has a U-shaped cross-section (cross-section in the main part 16) and an O-shaped cross-section (cross-section in the joining part 18). In alternative embodiments, other forms of open or closed cross-sections may be provided.

Figure 3:
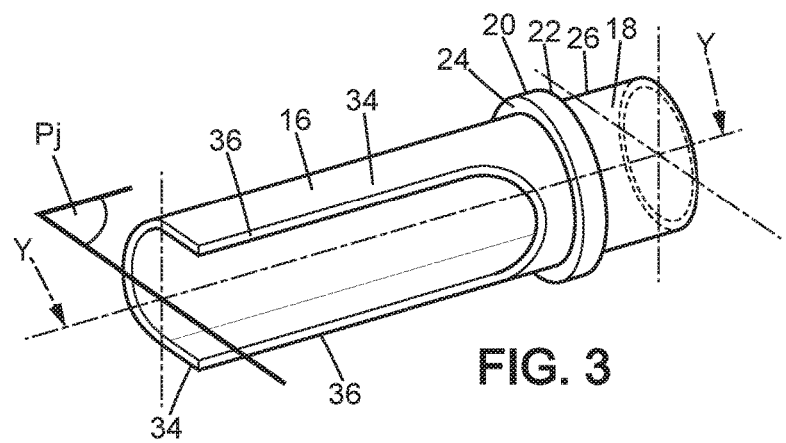
FIG. 3 is a perspective view of the joining part of the second portion of the crosspiece and of a portion of the main part.
Figure 4:
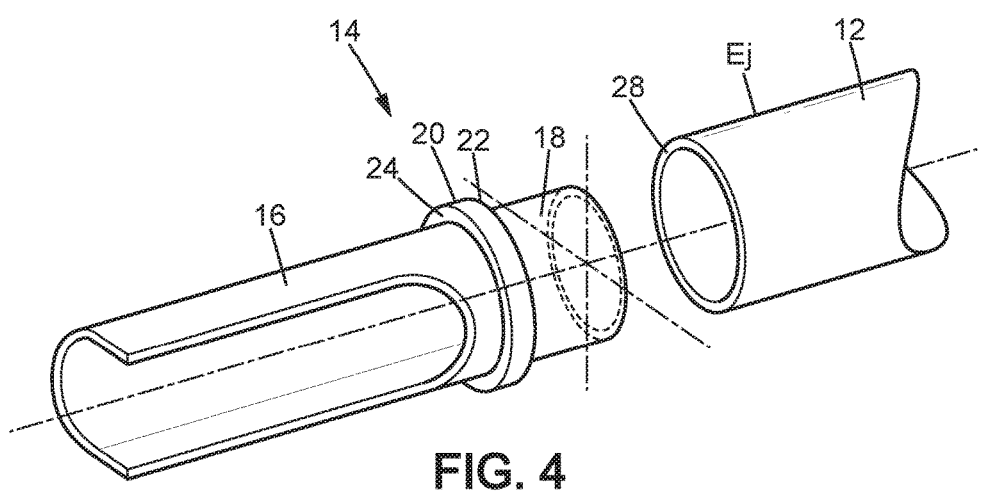
FIG. 4 is a perspective view of the joining part of FIG. 3 and of the joining end of the first portion of the crosspiece.

As can be seen in FIG. 3 or 4, the main part 16 and the joining part 18 are separated from each other by a flange 20. This flange 20 may extend radially in a plane substantially perpendicular to the longitudinal direction. In alternative embodiments, the flange 20 may lie in a plane forming a non-right angle with the longitudinal direction Y. The flange 20 is as represented in FIG. 3 as being of circular shape. However, in alternative embodiments, the flange 20 may have a non-circular shape, for example square or oval. The flange 20 may be continuous, as illustrated in FIG. 3, or may be non-continuous. If the flange 20 is non-continuous, lugs protrude from the intermediate part located between the joining part 18 and the main part 16.

When a lateral impact occurs to the body of the vehicle, particularly in the longitudinal direction Y, the flange allows some of the impact to be absorbed (without any risk of buckling in the crosspiece tube 10 and its subsequent sudden intrusion into the passenger compartment of the vehicle).

The flange 20 has a first surface facing the joining part 18 and a second surface facing the first portion 12. The second surface forms a stop surface of the joining interface when stress is applied in the longitudinal direction Y. The second surface also serves as a positioning stop as well as a stop during assembly of the joining part 18 of the second portion 14 to the first portion 12.

The joining part 18 has an outer surface facing the first portion 12, and an inner surface opposite the outer surface. The outer surface may be smooth but in order to improve the connection between the joining part 18 and the first portion 12, the outer surface may have a rough surface which can be obtained, for example, by notching, scoring, or knurling the outer surface of the joining part 18. The outer surface may also comprise gripping grooves.

It is possible to securely attach the joining part 18 and the first portion 12 by plastic deformation of the first portion 12, or in the current case by plastic deformation of the joining end Ej of the first portion 12.

Figure 6A:
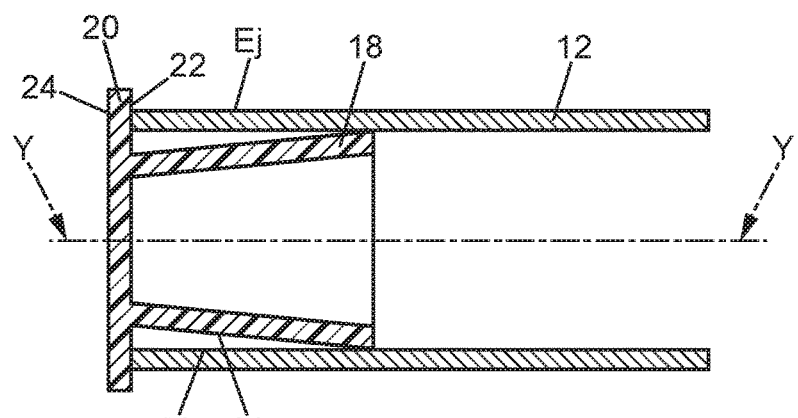
Figure 6B:
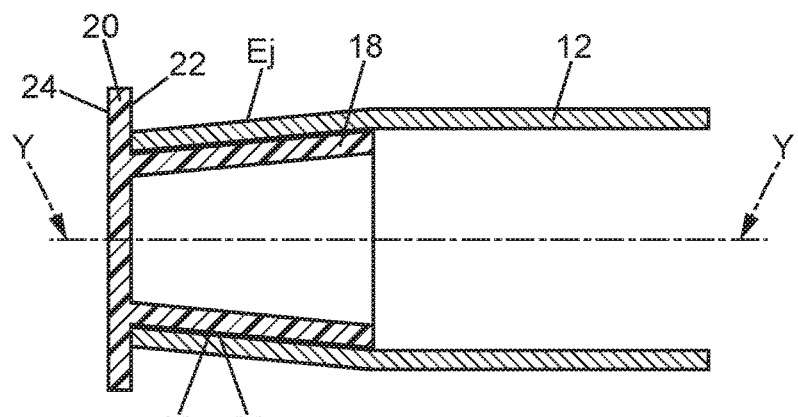

The joining part 18 may comprise a frustoconical shape with the smaller diameter base facing the main part 16. The first portion 12 is then substantially cylindrical, as illustrated in FIGS. 6A and 6B. The joining part 18 is fitted into the first portion 12, the larger diameter base then being flush with the inner surface of the first portion 12. The generatrix of the cone of the joining part 18 may, for example, form an angle of at least about 5° with the longitudinal direction Y. This angle improves the fit between the joining part 18 and the first portion 12. There may be a clearance before assembly, between the inner surface of the first portion 12 and the outer surface of the joining part 18 at its larger diameter base. For example, the clearance before assembly may be at least 0.2 millimeters. The joining end Ej extends in the longitudinal direction Y for a distance of at least 20 mm.

Figure 5:
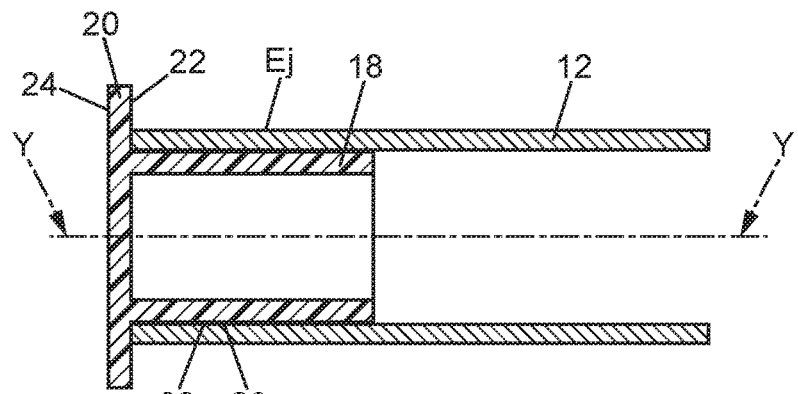
FIGS. 5, 6A, and 6B are schematic views of the connection between the joining part and the joining end according to two different embodiments of the joining part.

In another embodiment, schematically represented in FIG. 5, the joining part 18 is cylindrical and fits into the joining end Ej of the first portion 12 which is itself also cylindrical. In this case, the outer surface of the joining part 18 may include gripping grooves. The gripping grooves allow reinforcing the mechanical connection between the first and second portions 12,14. In addition, a glue joint may be provided between the first and second portions 12, 14 at their connection. In alternative embodiments, holes may be provided at the connection to allow injecting material and to improve the secure attachment of the first and second portions 12, 14.

In an alternative embodiment (not shown), the crosspiece 1 may further comprise a third portion. For example, the third portion may be one of the mounting brackets, the second portion 14 a part of the crosspiece tube 10, and the third portion the other mounting bracket and a part of the crosspiece tube 10. In this alternative embodiment, the first portion 12 and the second portion 14 are made of the same or similar material. For example, the first and third portions are metal.

The invention claimed is:

1. Crosspiece for a motor vehicle dashboard, extending substantially in a longitudinal direction and comprising:
    a first portion made of a first material, the first portion of the crosspiece extending substantially in the longitudinal direction and having a closed cross-section perpendicular to the longitudinal direction, the first portion of the crosspiece comprising a hollow joining end,
    a second portion made of a second material, the first material being different from the second material, wherein the second portion of the crosspiece comprises:
        a main part extending substantially in the longitudinal direction, and
        a joining part fitted into the joining end of the first portion of the crosspiece and securely attached to this joining end, the main part and the joining part forming a single piece,
    wherein the main part has an open cross-section perpendicular to the longitudinal direction, adapted for demolding in a demolding direction perpendicular to the longitudinal direction during manufacture of the second portion of the crosspiece, and wherein
    the joining part has a hollow closed cross-section perpendicular to the longitudinal direction adapted for demolding in the longitudinal direction during manufacture of the second portion of the crosspiece.

2. Crosspiece for a dashboard according to claim 1, wherein the first portion of the crosspiece is made of a metal material and the second portion of the crosspiece is made of a composite material.

3. Crosspiece for a dashboard according to claim 1, wherein a flange is provided between the joining part and the main part, said flange comprising a first surface facing the joining part and the first portion of the crosspiece and a second surface facing the main part, and wherein the first surface of the flange is adapted to form a stop in the longitudinal direction for the joining end of the first portion of the crosspiece.

4. Crosspiece according to claim 1, wherein:
the joining part comprises an outer surface facing the joining end of the first portion,
the joining end of the first portion of the crosspiece comprises an inner surface facing the joining part, and wherein
the outer surface of the joining part is rough so as to grip the inner surface of the joining end.

5. Crosspiece according to claim 1, wherein the first portion of the crosspiece has a first end of the crosspiece intended to be positioned next to a driver's seat of the vehicle, and wherein the second portion of the crosspiece has a second end of the crosspiece intended to be positioned next to a passenger seat of the vehicle.

6. Crosspiece according to claim 1, wherein the first portion of the crosspiece extends in the longitudinal direction for a distance of between 300 and 500 mm, wherein the second portion of the crosspiece extends in the longitudinal direction for a distance of between 500 and 900 millimeters, and wherein the joining part extends in the longitudinal direction for a distance of between 20 and 100 millimeters.

7. Crosspiece according to claim 1, wherein the joining part has a conical shape, the smaller diameter base of the cone being oriented towards the main part, and wherein the joining end of the first portion of the crosspiece is crimped to the conical shape of the joining part.

8. Crosspiece according to claim 1, wherein the joining part is cylindrical, and wherein gripping grooves are provided on the outer surface of the joining part.

9. Crosspiece according to claim 1, wherein the flange extends in a flange plane that is normal to the longitudinal direction.

10. Crosspiece according to claim 1, wherein a glue joint is arranged between the joining end and the joining part.

* * * * *